United States Patent [19]
Carlson

[11] Patent Number: 5,441,220
[45] Date of Patent: Aug. 15, 1995

[54] CONTAINER CARRIER

[76] Inventor: Marvin W. Carlson, R.R. 2 P.O. Box 79, Overton, Nebr. 68883

[21] Appl. No.: 288,024

[22] Filed: Aug. 10, 1994

[51] Int. Cl.6 .............................................. A47G 23/02
[52] U.S. Cl. ..................................... 248/154; 248/146
[58] Field of Search ............... 248/149, 146, 313, 312, 248/154; 224/202; 410/47, 49

[56] References Cited

U.S. PATENT DOCUMENTS

| | | |
|---|---|---|
| 122,685 | 1/1872 | Brocklin . |
| 879,914 | 2/1908 | Schriver et al. . |
| 2,230,511 | 2/1941 | Luttrup ........................... 248/146 X |
| 2,615,238 | 1/1948 | Highwood . |
| 2,665,097 | 9/1948 | Shaw . |
| 2,910,304 | 10/1959 | Caylor . |
| 3,387,811 | 7/1966 | Adams, Jr. . |
| 3,565,384 | 2/1971 | Lockwood ........................... 248/312 |
| 4,060,174 | 11/1977 | Gerhard ........................... 248/146 X |
| 4,150,806 | 4/1979 | Dziuk . |
| 4,486,044 | 12/1984 | Gordon ........................... 224/202 X |
| 4,555,083 | 11/1985 | Carter ........................... 410/47 X |
| 4,899,968 | 2/1990 | Eaglin ........................... 211/78 X |
| 5,346,165 | 9/1994 | Frean ........................... 248/154 X |

FOREIGN PATENT DOCUMENTS

| | | | |
|---|---|---|---|
| 462719 | 6/1928 | Germany | ........................... 248/149 |
| 917672 | 2/1963 | United Kingdom | ........................ 248/149 |

Primary Examiner—J. Franklin Foss
Attorney, Agent, or Firm—Kerkam, Stowell, Kondracki & Clarke; Edward J. Kondracki

[57] ABSTRACT

A carrier for transporting a pressurized container in the bed of a pickup truck is provided. The carrier is made up of a cradle and a positionable retaining ring attached to a support frame. The frame includes two substantially flat frame support members having angled flanges that form feet. The feet are adapted to overhang the end of the bed of the pickup truck in which the carrier is placed. When a tailgate of the pickup truck is closed, the feet are engaged such that the carrier is secured in place in the bed of the pickup truck and prevented from sliding in any direction during transport. The retaining ring is supported on telescoping rod members to be slidably adjustable to facilitate various sized containers. Optionally, the cradle is provided with a cargo lash that may be racheted to tightly secure the container to the carrier.

10 Claims, 3 Drawing Sheets

CONTAINER CARRIER

FIELD OF THE INVENTION

The present invention relates to a portable carrier or cradle for containers. Specifically, the invention relates to a portable carrier adapted to prevent sliding and rolling of the container during transport on the flatbed of a vehicle.

BACKGROUND OF THE INVENTION

In the field of container transport, it is important that the containers be adequately secured during transport to prevent injury to workers. When a container is pressurized, it is particularly important to prevent depressurization of the container or other damage to the container, particularly the neck of the container, which can lead to explosion and loss of property and pose a serious risk to the safety of persons working with these containers.

Pressurized and other container carriers conventionally employ an arrangement that allows the user to easily roll the carrier on the ground once it has been delivered to its destination. For example, most container carriers employ wheels on a hand-truck like structure, along with some means of ensuring that the container does not inadvertently slip or fall from the hand-truck, such as, for example, a strap or clamp.

Container carriers having wheels or the like have several associated disadvantages when used during transport via truck, rail, etc. The wheels of these carriers do not allow the carrier to be easily secured to the vehicle in which the container is being transported. It is extremely important that the container be secured during transport to avoid inadvertent damage to the container. Therefore, use of carriers having a hand-truck-like configuration is generally limited to moving the containers once they have arrived at their destination.

When transporting these containers via truck, rail and air, the containers are generally secured to the sides of the vehicle using an arrangement of brackets and clamps which are integrated to the vehicle, such as that shown in U.S. Pat. No. 2,615,238, to Highwood. Another type of carrier arrangement consists of using a structure in which the containers are held in place by a grid having gaps large enough to accommodate the containers. Using this type of transport requires specialized vehicles and limits other uses of the vehicle. Transporting single containers is made especially difficult since most single container users do not have access to these specialized transport systems.

SUMMARY OF THE INVENTION

In view of the foregoing, there is a recognized need for a convenient, portable container carrier that will protect the container and the user by preventing sliding and rolling of the container during transport. The carrier should also provide convenient set-up and removal from the transport vehicle.

Therefore, it is an object of the present invention to provide a lightweight, portable container carrier or cradle that prevents slipping and rolling of the container during transport.

It is another object of the invention to provide a convenient means for adapting the carrier to a vehicle, such as, for example, a pickup truck.

It is a further object of the invention to provide an adjustable carrier that will accommodate numerous container sizes.

To realize these and other objects and to overcome the disadvantages set forth above with respect to existing container carriers, a container carrier is provided, comprising: two substantially flat parallel support members; two brackets attached to the parallel support members to form a frame, a first bracket disposed toward a first end of said frame, a second bracket disposed toward a second end of said frame, said brackets adapted to accommodate a plurality of cradle support members; a plurality of cradle support members extending from said second bracket to said first bracket, said plurality of support members and said first and second brackets forming a cradle; two extended cradle support members arranged in parallel and including rods telescopingly supported in said two extended members and extending from said second bracket past said first bracket by a predetermined length; a retaining ring attached to said two rod members and adjustable in position therewith, said retaining ring adapted to receive a neck portion of said pressurized container; and two flanged feet, one foot formed at each end of said parallel support members, said feet comprising an angled portion of said parallel support members, said angled portions extending in a direction opposite a side of the frame on which said brackets extend, for allowing said feet to overhang an end of a bed of a pickup truck and securely fitting in a gap between the end of the bed and a tailgate when the tailgate is in a closed position.

A container carrier of this type is adapted to lie flat in the bed of a pickup truck or like vehicle. The feet extend over the back end of the bed of the truck and provide stability to the carrier when a tailgate of the truck is closed, thus locking the carrier into place.

In addition, the carrier may be optionally provided with a rachetable cargo lash that further secures the pressurized container to the carrier.

In this arrangement, the container becomes integrated with the carrier. The carrier is prevented from sliding by the feet engaged by the tailgate and the container is prevented from sliding by the retaining ring and cargo lash. The retaining ring position is adjustable to the length of the container by sliding two positioning rods in hollow portions of the extended cradle support members and locking the rods and associated ring into position using set bolts disposed on the extended cradle support members. In addition, the container is prevented from rolling by a shaped cradle formed by the brackets and cradle support members.

The container carrier described provides light, convenient and portable means for securely transporting containers in a safe manner.

BRIEF DESCRIPTION OF THE DRAWINGS

The preferred embodiments of the invention will be described herein with reference to the following drawings in which like reference numerals refer to like elements, and wherein.

DETAILED DESCRIPTION OF PREFERRED EMBODIMENTS

Figure 1:
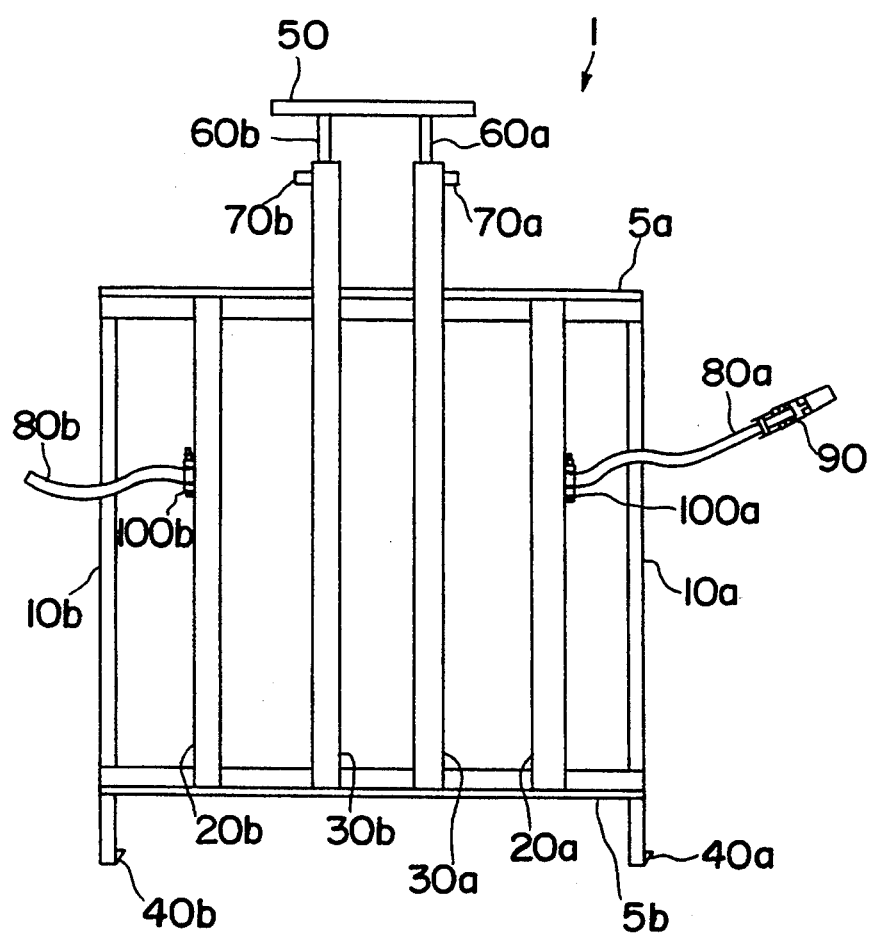
FIG. 1 is a frontal diagrammatic view of the container carrier of the present invention.
Figure 2:
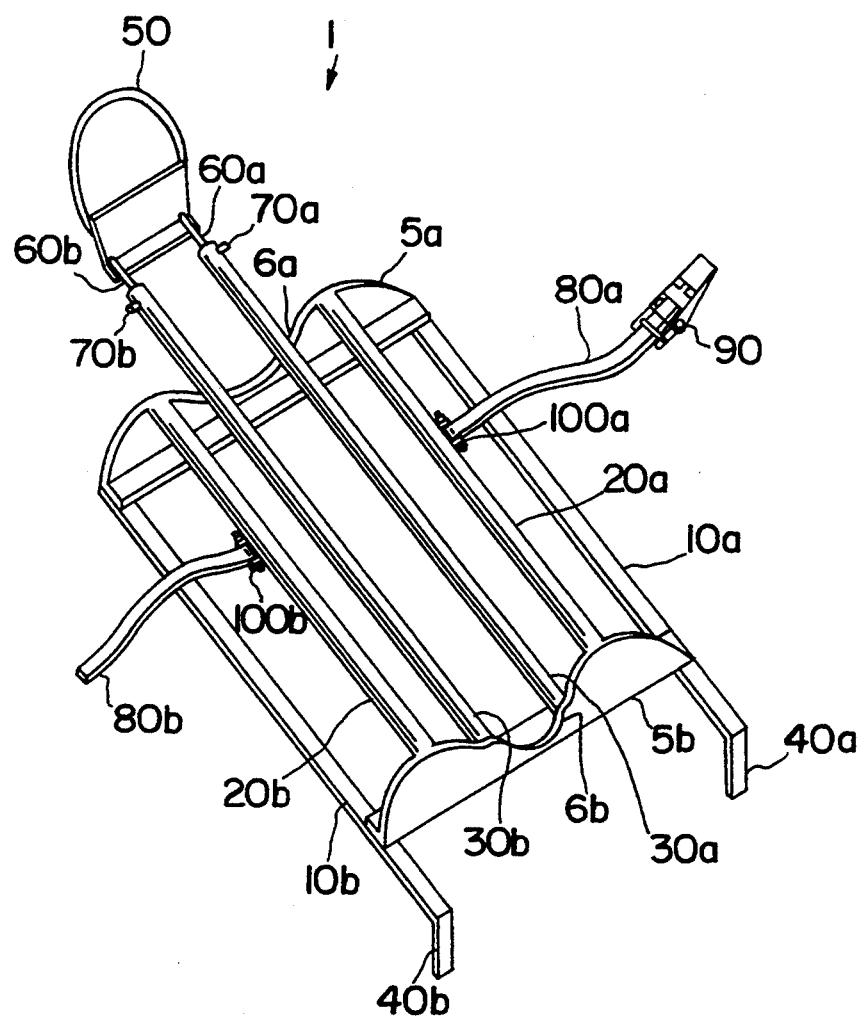
FIG. 2 is a perspective illustration of the container carrier shown in FIG. 1.

Referring to FIGS. 1 and 2, the container carrier 1 is shown having brackets 5a, 5b and parallel support members 10a, 10b, which are arranged together to form a frame of the carrier 1. The brackets 5a, 5b are also provided with a plurality of longitudinally extending parallel cradle support members 20a, 20b, 30a, 30b. Brackets 5a,5b include a shaped cutout 6a,6b, respectively, having a concave curved shape which advantageously conforms to the shape of the outer surface of the container to be transported. The brackets together with the cradle support members form a cradle that is integral with the frame. For additional security and stability of the container during transport, a retaining ring 50 is also preferably provided. The ring 50 is engaged with cradle support members 30a, 30b and adjustably positionable lengthwise along the longitudinal axis of the cradle by rods 60a, 60b which are adapted to slide into a hollow portion of support members 30a, 30b, respectively. The position of the retaining ring 50, once selected, is secured using set bolts 70a, 70b disposed in support members 30a, 30b, respectively.

To prevent rolling of the container during transport the brackets 5a, 5b include a central concave curved portion 6a, 6b which may be C-shaped or U-shaped to accommodate a container, with the opening directed upward and away from the lower part of the frame which rests in the bed of the transport vehicle. In addition, the cradle may be optionally provided with a cargo lash 80a, 80b which preferably includes a means for lashing down the container and tightening and releasing the lash, such as, for example, a rachet connector 90. The lash 80a, 80b is held in position via guide brackets 100a, 100b, respectively, that are disposed on predetermined cradle support members, preferentially those located at the outermost edges of the cradle. The cargo lash 80a, 80b may comprise two separate straps 80a, 80b as shown in the Figures, or it may be a single strap that extends circumferentially about the cradle and/or container. Feet 40a, 40b extend at right angles from support members 10, 10b, respectively, as a means of securing the carrier 1 against movement on a flatbed of a truck. Feet 40a, 40b may be welded or bolted extensions, or preferably, in its most economical form of construction, feet 40a, 40b comprise bent end portions of members 10a, 10b.

Figure 3:
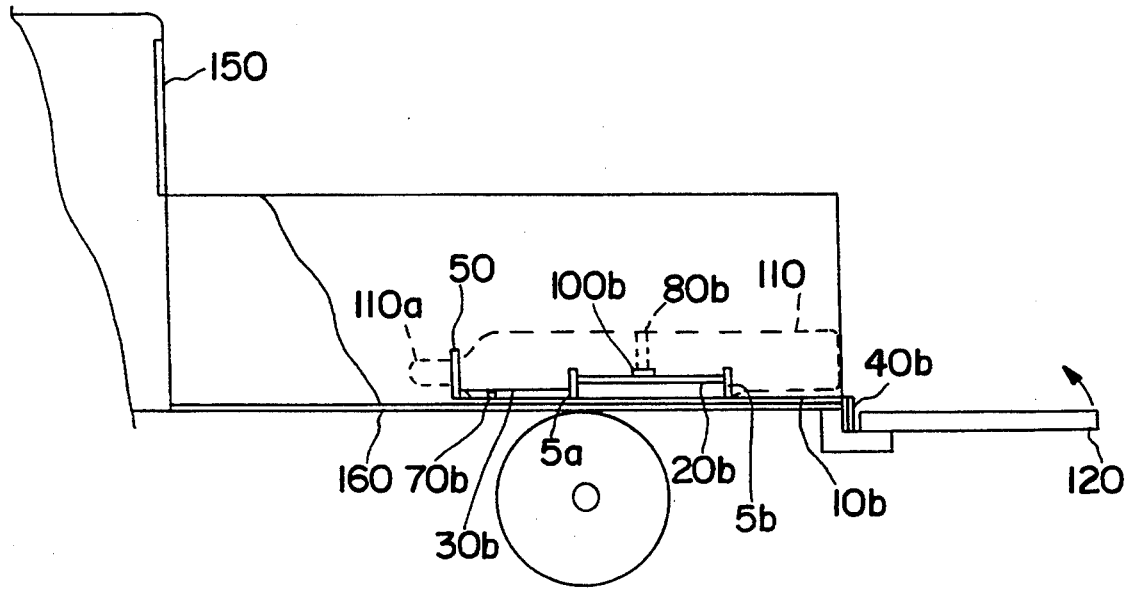
FIG. 3 is an illustration of the container carrier of FIG. 1 positioned in the bed of a pickup truck before closing of the tailgate.
Figure 4:
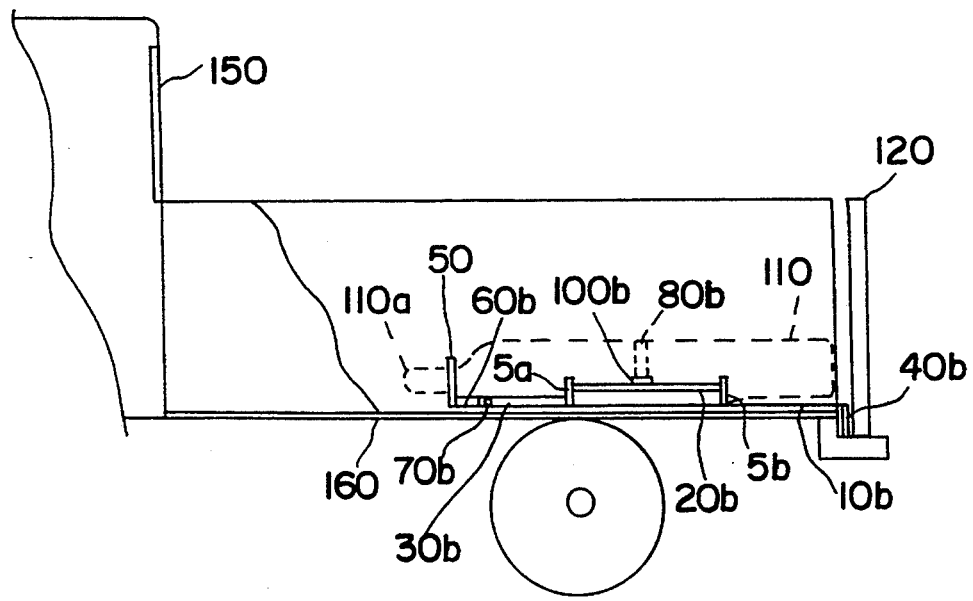
FIG. 4 is an illustration of the container carrier of FIG. 1 positioned in the bed of a pickup truck after closing of the tailgate.

The operation of the container carrier will now be described with reference to FIGS. 3 and 4 which show the carrier in operation in the bed of a vehicle, preferably a pickup truck. The container carrier 1 is placed in the bed 160 of a pickup truck 150 with the cradle extending in a direction opposite the bottom of the bed 160. A container 110, which may be pressurized, is then placed in the carrier 1, with a neck portion 110a being passed through the opening provided by the retaining ring 50. The retaining ring 50 is adjusted into a position by sliding or telescoping rod members 60a, 60b such that the base of the container 110 will abut the tailgate 120 of the pickup 150 when it is in the closed position shown in FIG. 4, and the ring 50 is preferably in contact with the cylinder 110 at a point where the outer circumference of the cylinder is substantially equal to the inner circumference of the ring 50. The retaining ring is then secured into position using the set bolts 70a, 70b. For additional security and stability, the cargo lash 80a, 80b is engaged an tightened via the rachet connector 90. The feet 40a, 40b of the carrier 1 overhang the back end of the bed 160 as shown in FIGS. 3 and 4. By overhanging the end of the carrier slightly on the bed 160, the feet 40a, 40b are engaged when the tailgate 120 is placed in its closed position. When the tailgate 120 is put into the closed position as shown in FIG. 4, the feet are secured between the end of the bed 160 and the closed tailgate 120. This arrangement in which the feet 40a, 40b of the carrier 1 are secured by closing of the tailgate 120, prevents sliding movement of the carrier 1 from side to side and from front to back, thus holding the carrier 1 firmly in place during transport.

By securing the carrier 1 to the truck 150 in the manner described above, a pressurized container 110 can be safely transported in the bed 160 of the truck 150 without the danger of causing damage to the container 110 caused by rolling and sliding about the bed 160 during transport. This is especially valuable in applications where there is no specialized vehicle available to transport the container 110 and when there are only one or two containers 110 to be transported.

When the container 110 arrives at its destination, it may be removed from the carrier by opening the tailgate 120, loosening the cargo lash 80a, 80b and removing the container 110 for subsequent transportation or service. Alternatively, the entire carrier 1 with the container 110 still secured by retaining ring 50 and the cargo lash 80a, 80b may be removed and placed directly on a hand-truck, or the like, for subsequent movement or service. To this end, the open framework facilitates handling and lifting of the carrier and container while the feet 40a, 40b enable the load to conveniently rest in the upright position with a minimum of effort on the part of the handlers.

While the invention has been described herein in conjunction with preferred embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as described herein and defined in the appended claims.

What is claimed is:

1. A container carrier, comprising:
   two parallel support members, each said support member having a foot disposed at an end portion thereof, each said flange comprising an angled extension portion of said support member;
   two brackets attached to said parallel support members to form a frame, a first bracket being disposed toward a first end of said frame, a second bracket being disposed toward a second end of said frame, said brackets being adapted to support a plurality of cradle support members;
   said plurality of cradle support members extending from said first bracket to said second bracket to form a cradle, two of said plurality of cradle support members arranged in parallel and extending from said second bracket past said first bracket by a predetermined length and adapted to receive rods connected to a retaining ring, said rods being slidable in said two of said support members;
   said retaining ring being adjustably disposed at an extended end of said extending cradle support members, said retaining ring adapted to receive a neck portion of said pressurized container, said ring being adjusted when said rods are slidably engaged in said extended support members; and said angled extensions of said support members being adapted to overhang an end of a surface on which said carrier rests.

2. The container carrier of claim 1, wherein said brackets include a concave portion having an open portion extending in a direction opposite the surface on which said carrier rests.

3. The container carrier of claim 2, further comprising a cargo lash having a rachet connector for securing said container to said carrier.

4. The container carrier of claim 2, further comprising a set bolt disposed on each said extending cradle support members for securing said rods attached to said retaining ring to secure said retaining ring in a fixed position.

5. The container carrier of claim 2, wherein said support members are bent at one end to form said angled extensions which extend in a direction opposite a direction in which said brackets extend.

6. A container carrier for transporting a container in a bed of a pickup truck, comprising:

two parallel support members, each said support member having an angled extension disposed at an end portion thereof, each said extension adapted to overhang said bed of said pickup truck and secure said carrier when a tailgate of said pickup truck is closed;

two brackets attached to said parallel support members to form a frame, a first bracket being disposed toward a first end of said frame, a second bracket being disposed toward a second end of said frame, said brackets being adapted to support a plurality of cradle support members;

said plurality of cradle support members extending from said first bracket to said second bracket to form a cradle, two of said plurality of cradle support members arranged in parallel and extending from said second bracket past said first bracket by a predetermined length and adapted to receive rods attached to a retaining ring said rods being telescopingly receive in said extended support members and slidable therein; and said retaining ring being adjustably disposed at an extending end of said extending cradle support members upon positioning of said rods, said retaining ring adapted to receive a neck portion of said container.

7. The container carrier of claim 6, wherein said brackets are substantially concave in shape at a central portion thereof and said concave portion of said brackets extends in a direction opposite the bed on which said carrier rests.

8. The container carrier of claim 7, further comprising a cargo lash having a rachet connector for securing said container to said carrier.

9. The container carrier of claim 6, further comprising a set bolt disposed on each said extended cradle support members for securing said rods attached to said retaining ring to secure said retaining ring in a fixed position.

10. The container carrier of claim 7, wherein said support members are bent at one end to form said angled extensions which extend in a direction opposite a direction in which said brackets extend.

* * * * *